H. E. IVES.
WATTS-PER-CANDLE PHOTOMETER.
APPLICATION FILED MAR. 10, 1913.

1,100,883.

Patented June 23, 1914.

WITNESSES:

INVENTOR
Herbert E. Ives
BY
Augustus B. Stoughton
ATTORNEY.

UNITED STATES PATENT OFFICE.

HERBERT E. IVES, OF MOUNT AIRY, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

WATTS-PER-CANDLE PHOTOMETER.

1,100,883.  Specification of Letters Patent.  Patented June 23, 1914.

Application filed March 10, 1913. Serial No. 753,262.

*To all whom it may concern:*

Be it known that I, HERBERT E. IVES, a citizen of the United States, residing at Mount Airy, in the county of Philadelphia and State of Pennsylvania, have invented a certain new and useful Watts-Per-Candle Photometer, of which the following is a specification.

The principal object of the present invention is to provide an instrument for finding the voltage at which incandescent electric lamps will give their standard efficiency or watts-per-candle power, and to make it as simple in operation, as the single circuit candle power volt scale photometer heretofore used, and, like it, operable on an unsteady voltage supply.

I accomplish the above object by applying two principles:—The first principle is that of registering both rate of energy consumption and candle power by the same indication, namely, illumination; and the second principle is that of measuring the test lamp rate of energy consumption relatively in terms of the standard or comparison lamp rate of energy consumption.

The invention will be claimed at the end hereof, but will be first described in connection with the embodiment selected from other embodiments for illustration in the accompanying drawings, in which—

Figure 2:
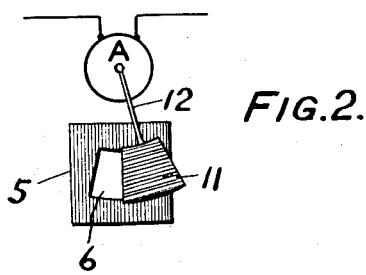
Figure 1:
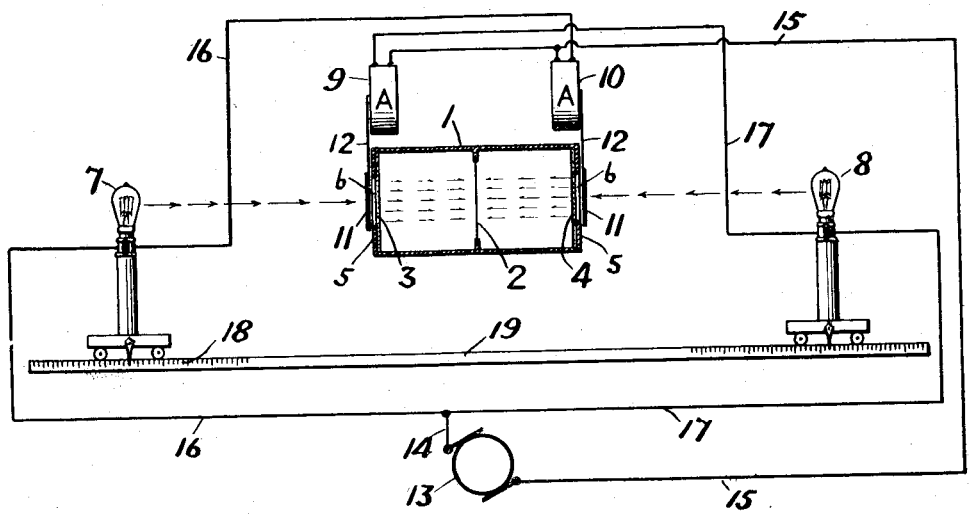

Figure 1, is an elevational view, partly in section and diagrammatically illustrating a watts-per-candle photometer for use on one single circuit wiring and embodying features of the invention, and Fig. 2, is a side elevation of a detail.

In the drawings 1, is a photometer head comprising a photometric screen 2, both sides of which may be viewed in juxta-position by suitable optical means not shown but which are well understood. At a short distance in front of each side of this screen 2 is a translucent diffusing glass 3 and 4, over which is an opaque plate 5, perforated at 6 by an aperture. The light from the test lamp 7 and the light from the comparison lamp 8 are incident upon the apertures which then serve as secondary light sources. This is indicated by the arrows in Fig. 1.

9 and 10 are instruments for measuring the rate of energy consumption. They are shown as ammeters since a response to current is sufficient, because the voltage is constant or varies similarly at both, as will be more fully explained. Each ammeter carries an opaque sector or screen 11 upon its indicating or movable needle 12 in such manner that the aperture beneath is opened an amount corresponding to the current passing through that ammeter. Each ammeter is connected in series with the lamp which illuminates the side of the photometer opposite to the side over which its attached sector or screen moves. From the source 13 there is a lead 14 and also a lead 15. From the lead 14 the current divides, one branch 16, passing through the test lamp 7 and then through the ammeter 10 to the lead 15; the other branch 17 passing through the comparison lamp 8, then through the ammeter 9 and to the lead 15; thus the lamps 7 and 8 are in parallel and the ammeter 9 is in series with the lamp 8 and the ammeter 10 is in series with the lamp 7. By these means the two sides of the photometric screen 2 receive illuminations respectively proportional to the current (watts, since voltage is constant or varies similarly at both lamps) and to the candle power of the test source. The position of photometric balance corresponds to definite ratio of current (watts) to candle power and all lamps brought to balance on the same point have the same efficiency. All other points on the scale 18 correspond to definite other efficiencies or to voltage requirements.

By the use of two ammeters, as described, the illumination which represents the current in the test source is made to correspond to the relative value of the current as measured in terms of the standard or comparison lamp current, whereby the effects of line voltage fluctuations are equally present on each side and so become negligible; it being understood that lamps of similar filament composition or characteristics are used at 7 and 8.

The mode of operation of the described instrument may be explained as follows and for the sake of this description it will be assumed that at first a test lamp is used which is equal in efficiency and candle power to the comparison lamp at the voltage obtaining on the circuit at the time of the test, and that both lamps are equally distant from the glasses 3 and 4. Evidently the screens 11 will so uncover the apertures 6 that there is a photometric balance on the screen 2. If now a test lamp be used which is equal in efficiency with the comparison lamp, but of greater or less candle power, such test lamp will require more or less current than did the test lamp referred to in the first instance. In consequence of this the ammeter 10 will shift its screen, thus increasing or diminishing the light that falls from the comparison lamp 8 and consequently increasing or decreasing the illumination from the secondary source 4 upon the screen preserving in this way the photometric match and showing that the test and comparison lamps are of equal efficiency at the same voltage. If now a test lamp of greater or less efficiency than the comparison lamp be used, the photometric match will no longer exist and in order to obtain a photometric match the test lamp 7 will have to be moved toward or away from the screen 2, or in other words, along the bar 19 and when the match is obtained the scale 18 indicates efficiency or upon a properly calculated scale the voltage at which the test lamp must be run in order to obtain the same efficiency as that of the comparison lamp. In the last instance the photometric match is dependent upon the coaction of the ammeters 9 and 10, which respond to current, (watts, voltage being the same on each side), and on the position of the test lamp 7 on the bar, which is representative of candle power, so that it is really dependent upon the watts-per-candle power.

It will be obvious to those skilled in the art to which the invention relates that modifications may be made in details of construction and arrangement, hence the invention is not limited in that regard or in any way further than the prior state of the art may require, but

Having thus described the nature and objects of the invention, what I claim as new and desire to secure by Letters Patent is:

1. A watts-per-candle photometer comprising the combination of a photometric screen, devices responsive to rate of energy consumption and arranged to transmit to the two sides of the screen fractions of the light from test and comparison sources, each proportional to the rate of energy consumption of the source illuminating the opposite side of the screen.

2. A watts-per-candle photometer comprising the combination of test and comparison lamps in parallel relation, a photometric screen, secondary sources of illumination respectively illuminated by the lamps and arranged on opposite sides of the screen, devices responsive to current and respectively in series relation with each lamp and each adapted to control the illumination of the secondary source illuminated by the other lamp, and a scale for indicating the relative positions of the lamps and secondary sources of illumination, substantially as described.

3. A watts-per-candle photometer comprising the combination of test and comparison lamps in parallel relation, a photometric screen, devices responsive to rate of energy consumption and respectively in series relation with each lamp and adapted to control the illumination, by the other lamp, and a photometric scale, substantially as described.

In testimony whereof I have hereunto signed my name.

HERBERT E. IVES.

Witnesses:
CLIFFORD K. CASSEL,
FRANK E. FRENCH.

and 8.